United States Patent [19]
Wood

[11] 3,802,265
[45] Apr. 9, 1974

[54] APPARATUS FOR USE IN MEASURING THE FLOW VELOCITY OF FLUID WITHIN A CONDUIT

[75] Inventor: William H. Wood, Moundsville, W. Va.

[73] Assignee: Allied Chemical Corporation, New York, N.Y.

[22] Filed: Sept. 7, 1972

[21] Appl. No.: 286,649

[52] U.S. Cl. .................................. 73/211, 73/406
[51] Int. Cl. ............................................ G01f 1/00
[58] Field of Search.......... 73/205 R, 211, 213, 395, 73/406, 407 R

[56] References Cited
UNITED STATES PATENTS

| | | | |
|---|---|---|---|
| 2,274,479 | 2/1942 | Inderdohnen et al. | 73/406 X |
| 3,163,529 | 12/1964 | Jewett | 73/406 |
| 3,124,956 | 3/1964 | Stohldrier | 73/211 |
| 3,130,586 | 4/1964 | Taylor et al. | 73/406 |
| 3,178,942 | 4/1965 | Bendy | 73/213 |

Primary Examiner—Charles A. Ruehl
Attorney, Agent, or Firm—Ernest D. Buff; Gerard P. Rooney

[57] ABSTRACT

Apparatus for use in measuring the flow velocity of fluid within a conduit is provided. Differential pressure of the fluid is measured by a differential pressure measuring means responsive to fluid pressure detected by the pressure sensing portions of sealed sensing means disposed adjacent to the upstream and downstream sides of a flow restricting means. The pressure sensing portion of the downstream sealed sensing means has a length substantially equal to the inside diameter of the conduit. Formulae and data empirically derived from conventional head flowmeter operations can be readily correlated with differential pressure readings of the sealed sensing means. The interior of each pressure sensing portion is isolated from the fluid. Hence, plugging of the sealed sensing means is prevented and the apparatus provides continuous, accurate fluid pressure differential readings from which the flow velocity is derived.

9 Claims, 2 Drawing Figures

APPARATUS FOR USE IN MEASURING THE FLOW VELOCITY OF FLUID WITHIN A CONDUIT

BACKGROUND OF THE INVENTION

1. FIELD OF THE INVENTION

This invention relates to apparatus for use in measuring the flow velocity of fluid in a conduit and more particularly to a head flowmeter having sealed pressure sensing means which contact the fluid and isolate it from a differential-pressure measuring means associated therewith.

2. DESCRIPTION OF THE PRIOR ART

One of the most troublesome problems of industrial instrumentation is the difficulty of economically measuring the flow velocity of fluid in a conduit with a high degree of accuracy. Head flowmeters conventionally used for such velocity measurements generally have flow restricting means for inducing a differential pressure, or head, within the conduit and differential pressure measuring means responsive to the pressure sensed by small holes tapped through the conduit wall and into the fluid on each side of the flow restricting means. Solid material suspended in slurries or precipitated from saturated solutions passed through the conduit frequently plugs the tapped holes, contaminates the differential pressure measuring means and greatly reduces its accuracy. Manufacturing and pollution standards cannot be satisfied unless accurate flow measurements are obtained. The conduit must be closed off to deplug the taps and repair the differential pressure measuring means, with the result that considerable production penalties are incurred. It has been reported that pressure sensing units having pressure taps sealed from the fluid by a flexible membrane may be used in pairs to measure pressure differential. But up to the present time no really satisfactory apparatus of this type has been produced. Unlike pressure taps designed to contact a small portion of the fluid and to measure pressure at localized points in the conduit, the sealed pressure sensing units contact a larger portion of the fluid and measure pressure over a relatively greater length of the conduit. Formulae and data empirically derived from conventional head flowmeter operations cannot be easily correlated with differential pressure readings of sealed pressure sensing units. Moreover, the sensitivity of such pressure sensing units is not sufficient to measure small increments of differential pressure. For the above reasons, apparatus of the type described has generally resulted in lower accuracies and higher costs for measuring fluid flow than are considered to be commercially acceptable.

SUMMARY OF THE INVENTION

The present invention provides an economical and accurate apparatus for use in measuring the flow velocity of fluid within a conduit. Such apparatus has flow restricting means for inducing a differential pressure within the conduit. A first sealed sensing means forms a portion of the conduit located adjacent to and upstream of the flow restricting means. A second sealed sensing means forms a portion of the conduit located adjacent to and downstream of the flow restricting means. Each of the first and second sealed sensing means has a pressure sensing portion for detecting the pressure of the fluid. The pressure sensing portion of the second sealed sensing means has a length substantially equal to the inside diameter of the conduit. The first and second sealed sensing means contact the fluid and isolate it from the interior of the pressure sensing portions thereof. A differential pressure measuring means responsive to fluid pressure detected by the first and second sealed sensing means measures differential pressure across the flow restricting means.

It has been found that significant advantages result from measuring differential fluid pressure induced in a conduit with apparatus of the type described above. The first and second sealed sensing means detect the pressure of the fluid and isolate it from the interior of the pressure sensing portions thereof. Hence, plugging of the sealed sensing means and contamination of the differential pressure measuring means are prevented. Due to the relationship between the length of the pressure sensing portion of the second sealed sensing means and the diameter of the conduit, formulae and data empirically derived from conventional head flowmeter operations can be readily correlated with differential pressure readings of the sealed sensing means. Thus, the apparatus continuously affords differential pressure readings having an accuracy far greater than that expected for flowmeter measurements. For a wide variety of slurries, caustics, acids and saturated solutions, and over a relatively wide range of temperatures, the apparatus advantageously provides continuous, accurate fluid pressure differential readings from which the flow velocity of the fluid is derived.

BRIEF DESCRIPTION OF THE DRAWINGS

The invention will be more fully understood and further advantages will become apparent when reference is made to the following detailed description and the accompanying drawings in which.

DESCRIPTION OF THE PREFERRED EMBODIMENTS

The fluid transferring conduits with which the present invention can be used may be fabricated in a number of diverse sizes and configurations. As a consequence, the invention will be found to function with most varieties of such conduits. For illustrative purposes, the invention is described in connection with a substantially cylindrical conduit for transferring a fluid therewithin. As used in this description and elsewhere in the specification and claims, the term fluid includes compressible and non-compressible substances tending to conform to the outline of a container, such as homogeneous liquids, emulsions, slurries, saturated solutions and suspensions, gases and gas-solid mixtures, and granular or pulverized solids and the like.

Figure 1:
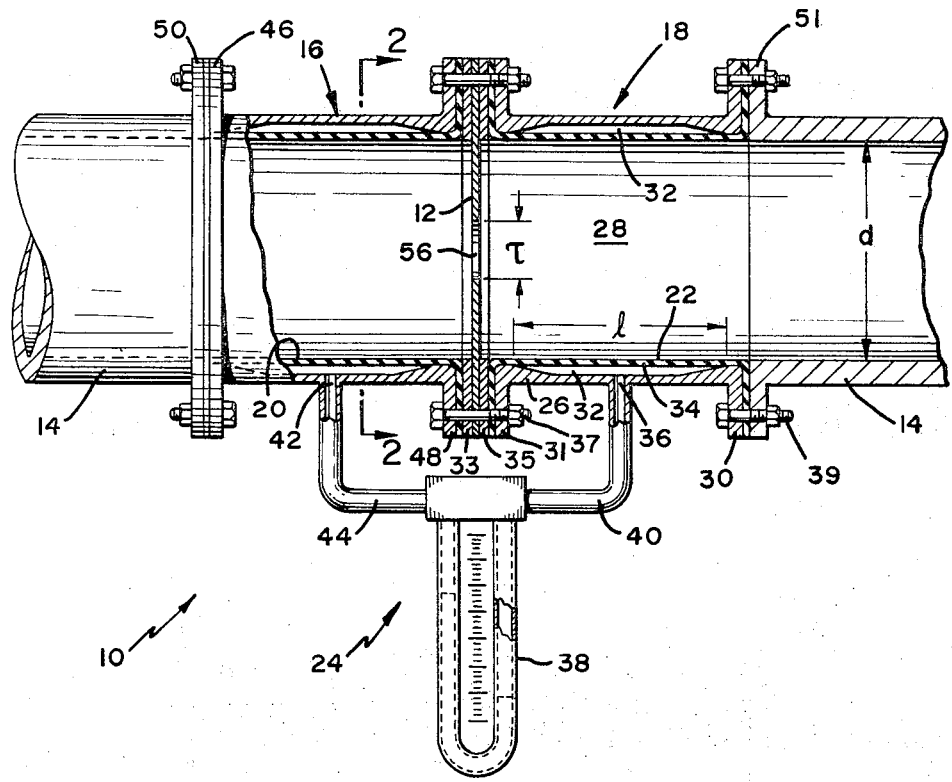
FIG. 1 is a side elevation, partly in section, of apparatus for use in measuring the flow velocity of fluid within a conduit.

Referring to FIG. 1 of the drawings, the apparatus is shown generally at 10. The apparatus 10 has flow restricting means 12 for inducing a differential pressure within a conduit 14. A first sealed sensing means, generally indicated at 16, forms a portion of the conduit 14 located adjacent to and upstream of the flow restricting means 12. A second sealed sensing means, generally indicated at 18, forms a portion of the conduit 14 located adjacent to and downstream of the flow restricting means 12. The first and second sealed sensing means 16 and 18 have pressure sensing portions 20 and 22, respectively. Pressure sensing portion 22 of second sealed sensing means 16 has a length, $l$, substantially equal to the inside diameter, $d$, of conduit 14. The term "substantially equal to" is intended to include those embodiments of the apparatus 10 wherein the length, $l$, ranges generally from about 90 to 110 percent of the inside diameter, $d$. Preferably, the length, $l$, of the pressure sensing portion 22 and the inside diameter, $d$, of the conduit 14 are essentially the same. A differential pressure measuring means, generally indicated at 24, is connected to the pressure sensing portions 20 and 22 of the first and second sealed sensing means 16 and 18, respectively. The first and second sealed sensing means 16 and 18 contact fluid passed through conduit 14 and isolate it from the interior of the pressure sensing portions 20 and 22. Hence, plugging of the first and second sealed sensing means 16 and 18 and contamination of the differential pressure measuring means 24 is prevented. The differential pressure measuring means 24 is responsive to fluid pressure detected by the first and second sealed sensing means 16 and 18 and measures differential pressure across the flow restricting means 12.

One form of the first and second sealed sensing means 16 and 18 is shown in FIG. 1. Other forms of the sealed sensing means can also be used. Preferably, each of the first and second sealed sensing means 16 and 18 is constructed in the same manner. Thus, the first sealed sensing means 16 can be constructed in the same manner as the second sealed sensing means 18, which is described hereinafter in more detail. Such means may comprise a body member 26 formed of a corrosive resistant material such as plastic, hard rubber, a corrosive resistant metal alloy, lead, brass or the like. The body member 26 has an axial bore 28 extending longitudinally therethrough and having an inside diameter somewhat greater than the inside diameter, $d$, of conduit 14, as in the order of about one-fourth inch to 1.0 inch greater in diameter. One end of body member 26 is provided with a flanged portion 30; the other end of body member 26 has a flanged portion 31. Pressure sensing portion 22 of second sealed sensing means 18 comprises a tap 32 having the shape of a substantially annular groove formed in the wall of body member 26 and spanned by a flexible membrane 34 so as to seal the tap 32 from fluid in the bore 28. Membrane 34 is formed of natural or synthetic rubber, plastic or other suitable material. Preferably, membrane 34 is a tube having a length and outside diameter substantially equal to the corresponding dimensions of bore 28. The inside diameter of membrane 34 is substantially equal to each of the inside diameter, $d$, of the conduit 14 and the length, $l$, of the tap 32. Membrane 34 is maintained in a taut position across tap 32 as described hereinafter, whereby fluid passed through conduit 14 and bore 28 is isolated from the interior of the pressure sensing portion 22.

Tap 32 is adapted to be filled with a non-compressible fluid such as water, ethylene glycol, mineral oil, mercury or the like from which all air is excluded. Such fluid can be introduced into tap 32 through a suitable passageway 36 in the wall of body member 26. A differential pressure measuring means 24, such as manometer 38, a force balance-type meter, a bellows-type meter or the like, is connected to the passageway 36 of pressure sensing portion 22 by means of a flexible tube 40. In like manner, the differential pressure measuring means 24 is connected to the passageway 42 of pressure sensing portion 20 by means of tube 44. Each of tubes 40 and 44 is filled with the non-compressible fluid, as are the interiors of pressure sensing portions 20 and 22. Hence, changes of fluid pressure in conduit 14 which distort the membrane of pressure sensing means 20 and 22 are transmitted to the differential pressure measuring means 24 by the fluid within pressure sensing means 20 and 22 and tubes 40 and 44.

The flow restricting means 12 may be an orifice plate, flow nozzle or any other means commonly used to induce differential pressure across a suitable restriction to flow of fluid within the conduit 14. Holding members 33 and 35, disposed on each side of the flow restricting means 12, hold it firmly in a fixed position within the conduit 14. Generally, the flow restricting means has a throat diameter, $\tau$, somewhat less than the conduit diameter, $d$. The differential pressure induced by the flow restricting means varies inversely with the ratio $\tau/d$ (or beta ratio) thereof and directly with flow velocity of the fluid. Selection of a particular type of flow restricting means 12 and of the beta ratio will, of course, depend upon the viscosity of the fluid and the flow velocity desired, and such considerations will be well understood by those skilled in the art. So long as the length, $l$, of pressure sensing portion 22 is substantially equal to the diameter, $d$, of the conduit 14, the beta ratio of the flow restricting means 12 can vary over a relatively wide range, as in the order of from about 0.2 to 0.7, preferably from about 0.4 to 0.5, and the apparatus 10 will provide continuous accurate pressure differential readings from which the flow velocity of the fluid is derived.

To assemble the apparatus 10, flanged portion 30 of body member 26 is secured to opposed flanged portion 51 of conduit 14 by mechanical fastening means 39 such as nuts and bolts or the like. Flanged portion 31 of body member 26 is then placed adjacent to holding member 35. In like manner, flanged portion 46 of the first sealed sensing member 16 is secured to flanged portion 50 of conduit 14, and flanged portion 48 is placed adjacent to holding member 33. The flow restricting means 12 is then placed between holding members 33 and 35. Each of flanges 48 and 31, holding members 33 and 35 and flow restricting means 12, are held firmly together by a mechanical fastening means 37 inserted therethrough. The tap portions of the respective sealed sensing means are filled with the non-compressible fluid and connected to the differential pressure measuring means 24 in the manner described above.

As shown in FIG. 1, the membrane 34 extends across pressure sensing portion 22 of body member 26 and into the collars provided by flanged portions 30 and 51 and by flanged portion 31 and holding member 35. Similarly, the membrane of the first sealed sensing means extends across the pressure sensing portion 20 and into the collars provided by flanged portions 50 and 46 and by flanged portion 48 and holding member 33. During assembly of the apparatus 10, the membrane is tightly drawn across the tap portion of its respective sealed sensing means and inserted into the collars thereof, which are then secured together by the fastening means to maintain the membrane in a taut position. Alternatively, the membrane may be tightly drawn across the tap portion of its respective sealed sensing means and then secured to the inside wall thereof by a suitable adhesive such as epoxy cement or the like. If necessary, a suitable sealing material such as soft rubber or plastic can be applied to the outer surface of the flanges to form a fluid tight seal between the collars of the apparatus 10.

Figure 2:
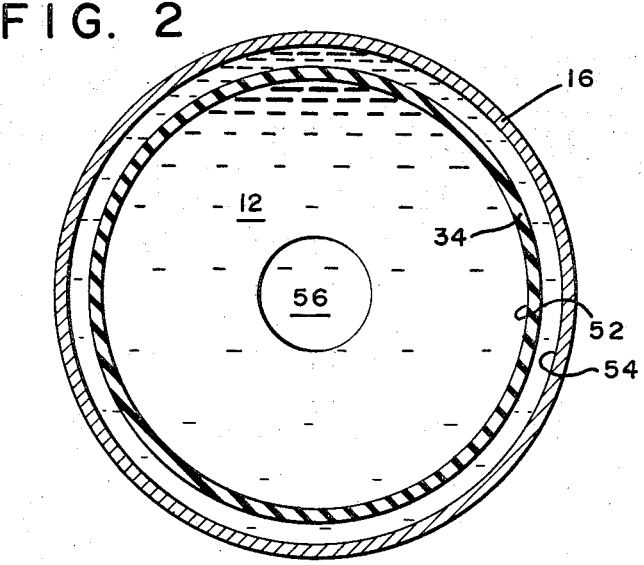
FIG. 2 is an end elevation taken along the line 2—2 of FIG. 1.

In FIG. 2 there is illustrated an end elevation taken along a line through the pressure sensing portion of the first sealed sensing means 16. During passage of fluid through the bore of the first sealed sensing means 16 and the throat 56 of the flow restricting means 12, each of the tap and the membrane of pressure sensing portion 20 has a substantially annular configuration in which the outer surface portion 52 of the membrane and the inner surface portion 54 of the first sealed sensing means 16 has a substantially circular shape. Such substantially annular configuration of the tap and the membrane (1) reduces obstruction of fluid flow and (2) affords maximum transmission of pressure changes for the transferred fluid and is, for this reason, preferred. Other configurations of the membrane and the tap, including ring-shaped structures wherein either or both of outer and inner surface portions 52 and 54 are polygonal, or structures wherein the rings are unclosed, such as those having either U-shaped or arcuate forms, can also be used. The forms of the tap and membrane shown in FIG. 2 are intended to be illustrative and should not be interpreted to limit the scope of the invention to the particular structure disclosed. Accordingly, the term "substantially annular configuration" as used in the specification and claims with reference to the tap and the membrane is intended to include, as well, configurations of the type discussed in this paragraph. So long as the flexible membrane is disposed between and isolates the transferred fluid from the noncompressible fluid of the tap, changes in pressure of the fluid within the sealed sensing means will be transmitted to the differential pressure measuring means 24.

In operation, the apparatus 10 is assembled between the opposed ends of a conduit 14 in the manner described above. Fluid transferred through the conduit 14 passes through the throat 56 of flow restricting means 12, whereby a differential pressure is induced within the apparatus 10. The pressure of the transferred fluid distorts the membranes of the first and second sealed sensing means 16 and 18 and displaces the noncompressible fluid in the taps provided by pressure sensing portions 20 and 22. A differential pressure measuring means 24 connected to the pressure sensing portions 20 and 22 of the first and second sealed sensing means 16 and 18 measures the differential pressure detected thereby. The sealing action of the membranes isolates the transferred fluid from the interior of the pressure sensing portions 20 and 22. Hence, plugging of the sealed sensing means and contamination of the differential pressure measuring means are prevented. Since the length of the pressure sensing portion 22 is substantially equal to the diameter of the conduit 14, the pressure of the vena contracta of the transferred fluid is detected by the pressure sensing portion 22. Thus, formulae and data empirically derived from conventional head flowmeter operations can be readily correlated with differential pressure readings of the first and second sealed pressure measuring means 16 and 18. As a result, the apparatus affords continuous, accurate differential pressure readings from which the flow velocity of the fluid is derived.

Having thus described the invention in rather full detail, it will be understood that these details need not be strictly adhered to but that various changes and modifications may suggest themselves to one skilled in the art, all falling within the scope of the invention as defined by the subjoined claims.

I claim:

1. Apparatus for use in measuring the flow velocity of fluid within a conduit, comprising:
   a. flow restricting means for inducing a differential pressure within said conduit;
   b. first sealed sensing means forming a portion of said conduit located adjacent to and upstream of said flow restricting means, and having a pressure sensing portion for detecting the pressure of said fluid;
   c. second sealed sensing means forming a portion of said conduit located adjacent to and downstream of said flow restricting means and having a pressure sensing portion the length of which is substantially equal to the inside diameter of said conduit for detecting the pressure of said fluid;
   d. differential pressure measuring means responsive to fluid pressure detected by said first and second sealed sensing means for measuring differential pressure across said flow restricting means; and
   e. said first and second sealed sensing means contacting said fluid and isolating it from the interior of the pressure sensing portions thereof.

2. Apparatus as recited in claim 1 wherein each of said first and second sealed sensing means has a pressure sensing portion of substantially equal length.

3. Apparatus as recited in claim 1 wherein said flow restricting means has a beta ratio ranging from about 0.2 to 0.7.

4. Apparatus as recited in claim 1 wherein each of said first and second sealed sensing means comprises a body member having an axial bore extending longitudinally therethrough, the wall of said body member having a tap formed therein, said tap being spanned by a flexible membrane so as to seal the tap from fluid in said bore.

5. Apparatus as recited in claim 4 wherein the diameter of said bore is greater than the diameter of said conduit.

6. Apparatus as recited in claim 4 wherein said membrane is a tube having a length substantially equal to the length of said bore and an outside diameter substantially equal to the inside diameter of said bore.

7. Apparatus as recited in claim 6 wherein the membrane is maintained in a taut position across said tap.

8. Apparatus as recited in claim 7 wherein said membrane is adhesively secured to the inside wall of said body member.

9. Apparatus as recited in claim 4 wherein each of the outer surface portion of said membrane and the inner surface portion of said tap has a substantially annular configuration.

* * * * *